(12) United States Patent
Li et al.

(10) Patent No.: US 7,930,134 B2
(45) Date of Patent: Apr. 19, 2011

(54) ELECTRONIC DEVICE FOR MEASURING MOTION OF SCREW MECHANISM

(75) Inventors: Guangjin Li, Guilin (CN); Jian Shi, Guilin (CN)

(73) Assignee: Guilin Gemred Sensor Technology Ltd., Guilin (CN)

( * ) Notice: Subject to any disclaimer, the term of this patent is extended or adjusted under 35 U.S.C. 154(b) by 0 days.

(21) Appl. No.: 12/342,124

(22) Filed: Dec. 23, 2008

(65) Prior Publication Data

US 2010/0004894 A1    Jan. 7, 2010

(30) Foreign Application Priority Data

Jul. 1, 2008   (CN) .......................... 2008 1 0073656

(51) Int. Cl.
*G01B 7/00*          (2006.01)
(52) U.S. Cl. ....................................... 702/158
(58) Field of Classification Search .................... 702/158
See application file for complete search history.

(56) References Cited

OTHER PUBLICATIONS

Yaw sensor, BOSCH, Oct. 18, 2001, p. 1-4.*

* cited by examiner

*Primary Examiner* — Tung S Lau
(74) *Attorney, Agent, or Firm* — Matthias Scholl P.C.; Matthias Scholl

(57) ABSTRACT

An electronic measuring device for measuring and displaying a linear displacement of a horizontal screw mechanism, the device comprising: a gravity acceleration sensor adapted for measuring an angle of rotation value of a horizontal rotational shaft of a screw mechanism; a data processing unit for converting the angle of rotation value into a linear displacement value according to characteristics of the linear screw mechanism; and a digital display unit for displaying the linear displacement value; in which the gravity acceleration sensor, the data processing unit, and the digital display unit are electronically or electrically connected.

20 Claims, 5 Drawing Sheets

ELECTRONIC DEVICE FOR MEASURING MOTION OF SCREW MECHANISM

CROSS-REFERENCE TO RELATED APPLICATIONS

Pursuant to 35 U.S.C. §119 and the Paris Convention Treaty, this application claims the benefit of Chinese Patent Application No. 200810073656.0 filed Jul. 1, 2008, the contents of which are incorporated herein by reference.

BACKGROUND OF THE INVENTION

1. Field of the Invention

The invention relates to a measuring device, and specifically, to a device for measuring linear displacement of a screw mechanism.

2. Description of the Related Art

Screw mechanisms have the capability of converting rotational motion into linear motion. Specific examples of screw mechanisms include leadscrews, ball screws, jackscrews, rack and pinions, etc.

Compared to other mechanisms capable of realizing linear motion, the screw mechanism provides a large speed reduction ratio, and a small linear displacement value associated with a large rotation angle. Driven by the development of modern manufacturing industry, highly precise driving and positioning can be readily realized with screw mechanisms, and thus screw mechanisms are widely used in the fields of precision instruments.

In order to quantify linear displacement in general, direct length measuring devices are widely utilized. These include linear grating, magnetic grating, induction synchronizer, and so on. In addition, indirect length measuring devices are also known, by which the rotation angle is measured first, and then the linear displacement value is obtained through scale conversion. However, conventional indirect length measuring devices must be installed perfectly parallel and concentric to the motion direction of the screw mechanism to avoid generating large measuring errors.

For applications utilizing horizontal screw mechanisms, a hand wheel gravity-based vertical position indicator has been developed by Siko. Based on the principle of gravity, a free oscillating pendulum set inside the indicator drives a gear system to transfer motion of the oscillating pendulum to a pointer. However, the application of a gear, a pointer, and a dial indicating system limits the measuring resolution and accuracy. Therefore, much opportunity for improvement exists in the field of measuring linear motion of horizontal screw mechanisms.

SUMMARY OF THE INVENTION

Accordingly, it is one objective of the present invention to provide a measuring device for measuring the linear displacement value of a horizontal screw mechanism that has the advantages of digital displaying the measured data, easy installation, high precision of measurement, low energy consumption, and easy maintenance.

In order to realize the above objective, provided an electronic measuring device for measuring the linear displacement of a horizontal screw mechanism, comprising: a gravity acceleration sensor; an MCU (Microprocessor Control Unit) data processing unit ("MCU"); a control unit; a digital display unit; and a supporting and protecting member.

In certain classes of this embodiment or in other embodiments, measuring the linear displacement of a horizontal screw mechanism comprises a) using the principle of gravity, obtaining a digital quantity of the rotation angle of the rotational shaft by measuring the rotation angle of the horizontal rotational shaft of the screw mechanism relative to the vertical position via the means of an inertial sensor sensitive to the Earth gravity field; b) calculating the ratio relationship between the angle and the linear displacement according to the characteristic of the screw mechanism; c) obtaining the linear displacement value by processing the data with the MCU unit; and d) displaying the digital linear displacement value on the display unit.

As shown in FIGS. 1-2, to digitally measure the quantity of the rotational angle of the horizontal rotational shaft relative to the vertical, constant acceleration sensors e.g., of a silicon micro capacitive-type, a silicon micro piezoelectric-type, a silicon micro thermocouple-type, a silicon micro resonant-type, or a silicon micro optical waveguide-type; or gravity acceleration sensors, e.g., of a membrane potential-type, a disk capacitive gate-type, can be applied. The silicon micro capacitive-type sensor, the silicon micro piezoelectric-type sensor, the silicon micro thermocouple-type sensor, the silicon micro resonant-type sensor, and the silicon micro optical waveguide-type are acceleration sensors designed based on Micro Electro-Mechanical Systems technology (MEMS).

Through subsequent data processing with the MCU unit, the linear displacement value of the screw mechanism can be obtained and displayed digitally. The control unit mainly sets the reference zero point. The supporting and protecting member supports and protects the sensor.

In a class of this embodiment or in another embodiment of the invention, the measuring device is designed to digitally measure the quantity of the rotational angle of the shaft of the horizontal screw mechanism relative to the vertical based on the principle of gravity. Because gravity acts on the measuring device approximately in the same direction regardless of the local position, the detecting components of the measuring device do not need to be oriented concentrically with respect to the rotational shaft. Therefore, in a class of this embodiment or in another embodiment of the invention, the measuring device is attached to the screw mechanism in an off-center position, as shown in FIGS. 3-4.

In a class of this embodiment, the measuring range for measuring the angle of rotation value of between 0 and N*360° relative to vertical, wherein N is a number of rotation. N is an integer greater or equal to 1 and less then infinity. Particularly, the measuring range for measuring the angle of rotation value is between 0 and 360°, 720°, 1080°, 1440°, 1800°, and so on.

In a class of this embodiment or in another embodiment of the invention, a gravity inertial acceleration sensor is applied to digitally measure the quantity of the rotational angle of the rotational shaft of the horizontal screw mechanism relative to the vertical. In addition to obtaining electric signal parameters, high resolution of the angle of rotation can be also readily obtained, laying the foundation for realizing a digital and highly precise measurement.

In a class of this embodiment, the resolution for measuring the angle of rotation value is at least 1.0°, at least 0.5°, at least 0.2°, at least 0.1°, at least 0.05°, at least 0.02°, or at least 0.01°. In a class of this embodiment, the accuracy for measuring the angle of rotation value is at least 1.0°, at least 0.5°, at least 0.2°, at least 0.1°, at least 0.05°, at least 0.02°, or at least 0.01°.

In a class of this embodiment or in another embodiment of the invention, an MCU (microprocessor control unit) processes the sensor data so that (a) the programmable characteristic and the calculation capability of the MCU is fully utilized; (b) the precise ratio coefficient between the rotational angle of the screw mechanisms and the linear displacement value at different lead distances can be used in calculations; and (c) the application flexibility of the measuring device is increased.

In a class of this embodiment or in another embodiment of the invention, the memory function of the MCU is applied to record an amount of lost motion of the screw mechanism due to play, and the lost motion amount is processed and deducted before the value is displayed on the display unit, so as to make the displayed value closer to the actual displacement value. The practicability and reliability of the measuring device is increased accordingly.

In a class of this embodiment or in another embodiment of the invention, a plurality of inclined-placed reading windows is set on the display unit for easy reading of the digital value, as shown in FIG. 2.

In a class of this embodiment or in another embodiment of the invention, the measuring device is used to determine the linear displacement of the carriage and the cross-slide in a lathe.

BRIEF DESCRIPTION OF THE DRAWINGS

The invention is described hereinbelow with reference to accompanying drawings, in which.

DETAILED DESCRIPTION OF THE EMBODIMENTS

Example 1

Figure 1:
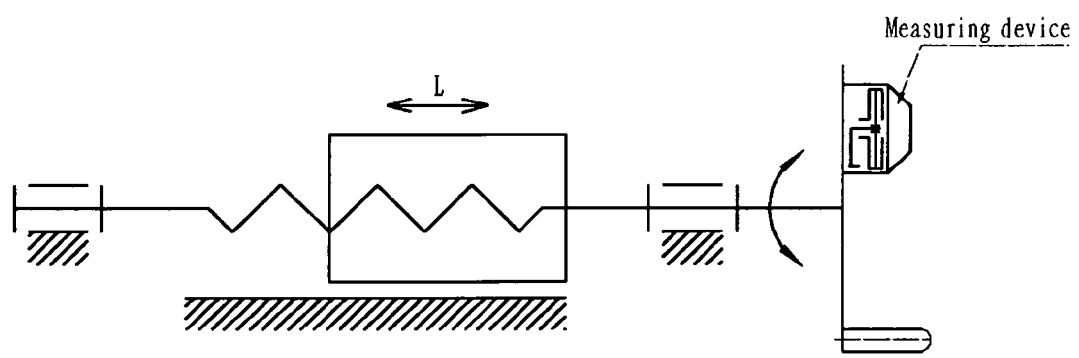
FIG. 1 is a structural view of a measuring device in accordance with one embodiment of the invention attached to a screw mechanism.
Figure 2:
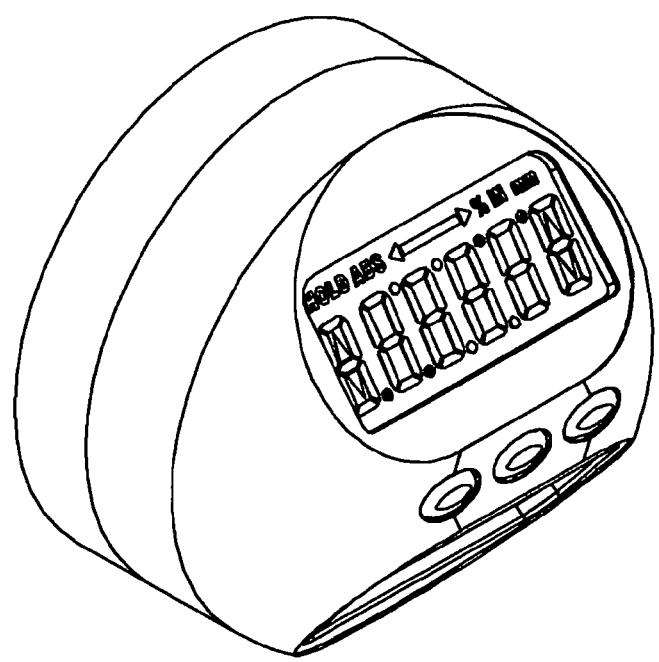
FIG. 2 is a perspective view of a measuring device in accordance with one embodiment of the invention.
Figure 3:
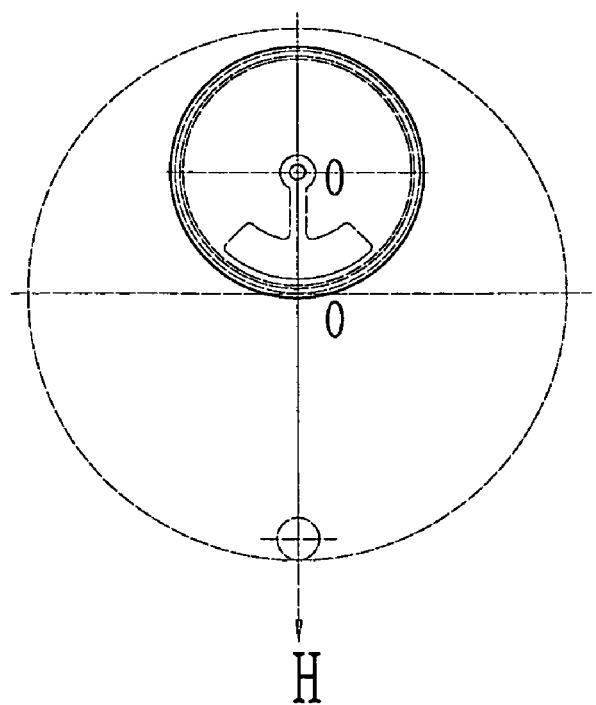
FIG. 3 illustrates an initial position of the measuring device attached to a dial handle of a screw mechanism in accordance with one embodiment of the invention.
Figure 4:
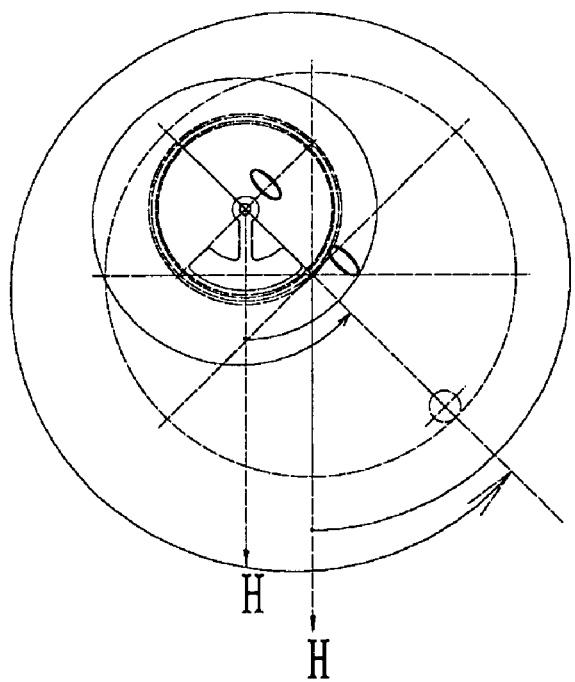
FIG. 4 illustrates a measurement position of the measuring device attached to a dial handle of a screw mechanism in accordance with one embodiment of the invention after being rotated by 1 and ⅛ turn counterclockwise (405°)
Figure 5:
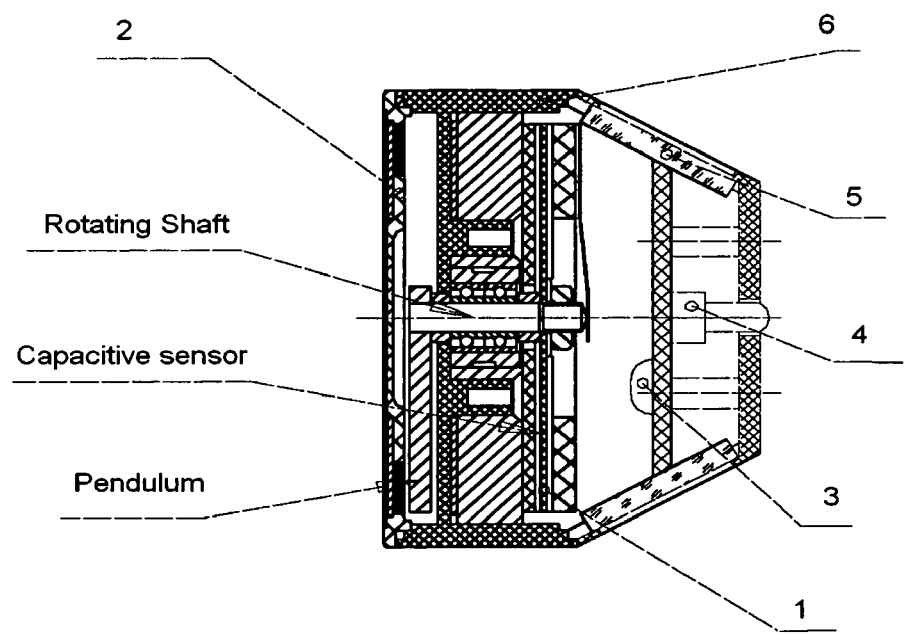
FIG. 5 is a structural view of a measuring device in accordance with a first embodiment of the invention.
Figure 6:
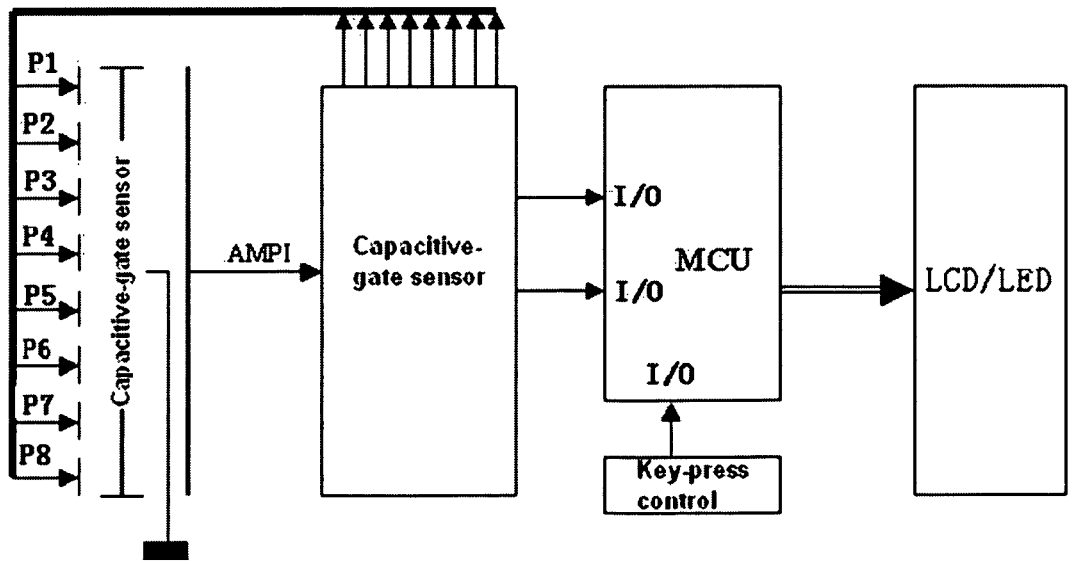
FIG. 6 is a circuit block diagram of the measuring device in accordance with the first embodiment of the invention.

With reference to FIGS. 5-6, the measuring device of the present invention comprises a gravity acceleration sensor 1 comprising a vertical gravity pendulum unit and a disk capacitive gate sensor; an end face magnetic damping device 2; an MCU (microprocessor control unit) data processing unit 3; a key-press control unit 4; a LCD/LED display unit 5; and a housing 6 comprising a supporting and protecting member.

The vertical gravity pendulum unit of the gravity acceleration sensor 1 has a simple pendulum structure wherein a rotational shaft and a precision bearing act as rotator and supporter. An eccentric mass block is used as a pendulum. The disk capacitive sensor comprises a moving gate and a fixed gate. The moving gate is connected to the rotational shaft of the simple pendulum, and the fixed gate is connected to the housing 6.

When the measuring device is rotating with the rotational shaft of the horizontal screw mechanism, the fixed gate also rotates, while the moving gate of the disk capacitive sensor keeps returning to the vertical position owing to the gravity acting on the pendulum, generating relative rotational angle change between the moving gate and the fixed gate, and thus leading to a change in the coupling capacitance between the moving gate and the fixed gate.

The pulse equivalent amount corresponding to the relative rotational angle between the moving gate and the fixed gate is obtained by sending an electric signal variation corresponding to the change of the coupling capacitance into the capacitive gate sensor for ASIC processing. The output pulse equivalent amount when the relative rotation between the moving gate and the fixed gate has stopped is the pulse equivalent amount corresponding to the change of the rotational angle of the rotational shaft of the screw mechanism.

The end face magnetic damping device 2 is parallel to the oscillation plane of the pendulum. A plurality of thin magnetic slices is circularly disposed along the circumferential edge, and the magnetic poles of adjacent magnetic slices are opposite to each other. One face of each magnetic slice is affixed to a magnetic conducting ring; the other face serves to form an air magnetic circuit. The pendulum is kept in the air magnetic gap.

When the simple pendulum is oscillating in the gravitational field, the pendulum cuts the magnetic lines of force to generate eddy current, and thereby to form resistance to the oscillating motion of the pendulum. The eddy current is proportional to the oscillation speed. Because the oscillation resistance decreases with the decrease of the oscillation speed, the ultimate position of the pendulum is not influenced by the resistance. Contrarily, the oscillation of the pendulum can be stabilized quickly due to the existence of oscillation resistance. Therefore, the pulse equivalent amount of the relative rotation angle between the moving gate and the fixed gate of the capacitive gravity acceleration sensor can reflect rapidly and reliably the relative rotational angle variation of the rotational shaft of the screw mechanism.

The measuring device of the invention is practical and can be used under oscillating condition of the pendulum. The end face magnetic damping device functions in the entire range of 360°. The MCU data processing unit 3 processes and converts the pulse equivalent amount of the relative rotation angle between the moving gate and the fixed gate of the capacitive gravity acceleration sensor. According to the screw driving equation characteristic to a screw mechanism, the linear displacement value L is equal to the lead S of the screw divided by a circular angle (360°) and multiplied by the relative rotation angle θ of the rotational shaft, namely, $$L=(S/360°)*\theta.$$

The lead S is the linear distance the nut advances in one revolution of the screw (in or out). The θ value can be calculated by processing and converting the pulse equivalent amount of the relative rotation angle between the moving gate and the fixed gate of the capacitive gravity acceleration sensor. The S value is input or selected through key-press control according to the actual value. After the linear displacement value L is calculated by the above formula, it can be transformed into metric or British system according to demand, and can be coded and digitally output and displayed on the LCD/LED display unit 5.

Specifically, if the lead of a lead screw is 10 mm, i.e., if a nut advances 10 mm with each revolution of a screw and if the relative rotation angle measured by the capacitive gravity acceleration sensor is 22°, then the linear distance L would be L=(10 mm/360°)×22°=0.61 mm. The linear distance can be displayed as 0.61 mm or in inches as 0.02406 inches. Similarly, if the lead of a lead screw is ½ inch, i.e., if a nut advances ½ inch with each revolution of a screw and if the relative rotation angle measured by the capacitive gravity acceleration sensor is 22°, then the linear distance L would be L=(½ inch/360°)×22°=0.0305 inches. The linear distance can be displayed as 0.0305 inches or in mm as 0.7761 mm.

Besides, owing to the existence of manufacturing errors and tolerances, lost motion due to, e.g., play may occur with the screw mechanism. Especially when the screw mechanism is moving back, such a situation could appear that the rotational shaft has started rotating, but the linear displacement does not start synchronously. Since the capacitive gravity acceleration sensor functions to detect and record the rotation angle variation of the rotational shaft, the obtained linear displacement value based on processing the rotation angle variation would be then inconsistent with the actual back movement linear displacement value. In view of this situation, a program is included in the program processing of the MCU unit to modify the back movement linear displacement value. The actual lost motion deviation value will be measured on site and then be input through key-press control to the program for modifying the displayed value (lost motion calibration), so that the measuring device of the invention is more accurate.

The housing 6 comprised of supporting and protecting member is designed with electric and magnetic shielding and dust/water protection, so that the capacitive gravity acceleration sensor and the MCU data processing unit are well protected; resistance to vibration, disturbance, and contamination are improved, and the operational stability and reliability of the measuring device are increased. The supporting and protecting member is designed with quick assembly and disassembly components, such as magnetic adhesion, quick assembly fitting members, according to demand, to facilitate the installation and maintenance of the measuring device.

In accordance with a first embodiment of the invention, the gravity acceleration sensor comprises a vertical gravity pendulum unit and a disk capacitive sensor. This provides the advantages of: 1) wide measuring range, perfect linearity, and multi-turn capability of measurement; 2) applying special integrated circuit (IC) to output digital signal for subsequent processing; 3) magnetic interaction between the moving gate and the fixed gate, free from disturbance to the sensitivity of the vertical gravity pendulum, quick response speed, small temperature difference, low energy consumption, etc. In coordination with a special end face magnetic damping device (see, e.g., China Pat. Appl. 200520035401.7), the measuring device of the invention offers more practicality and versatility.

In accordance with the first embodiment of the invention, the gravity acceleration sensor comprises a vertical gravity pendulum unit and a disk capacitive sensor, providing the advantage that the resolution of the disk capacitive sensor can be adjusted according to actual demand. Measuring devices with different manufacturing cost and different precision can be manufactured to satisfy different application requirements. For example, if the sensor is 2-pitch manufactured, then the screw mechanism corresponding to 10 mm lead will have a minimum resolution of 10 μm; and if the sensor is 18-pitch manufactured, the screw mechanism corresponding to 10 mm lead will have a minimum resolution of 1 μm.

Example 2

Figure 7:
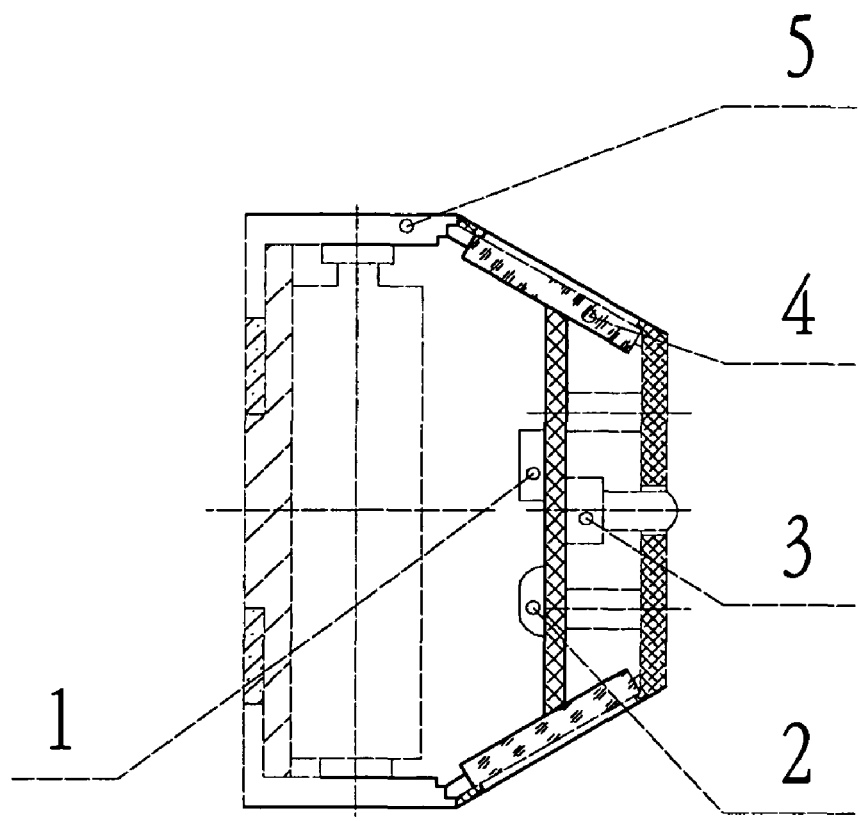
FIG. 7 is a structural view of a measuring device in accordance with a second embodiment of the invention.
Figure 8:
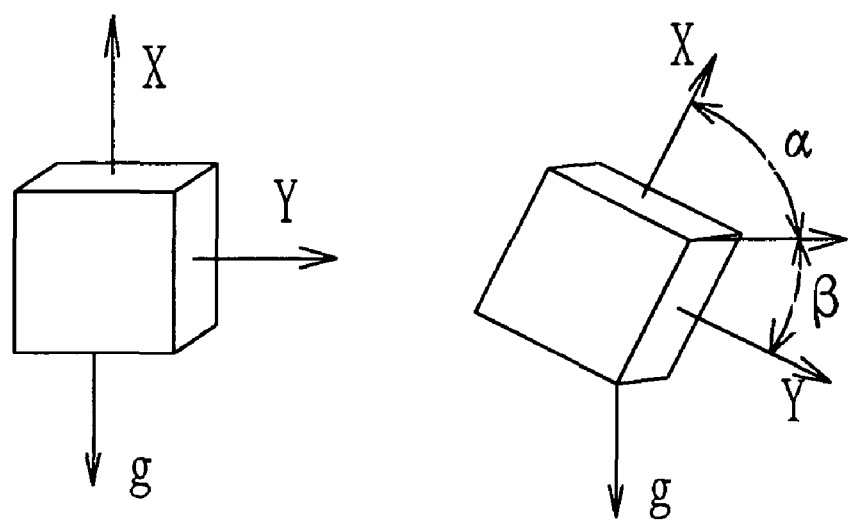
FIG. 8 illustrates the position of a sensor in the measuring device in accordance with the second embodiment of the invention.
Figure 9:
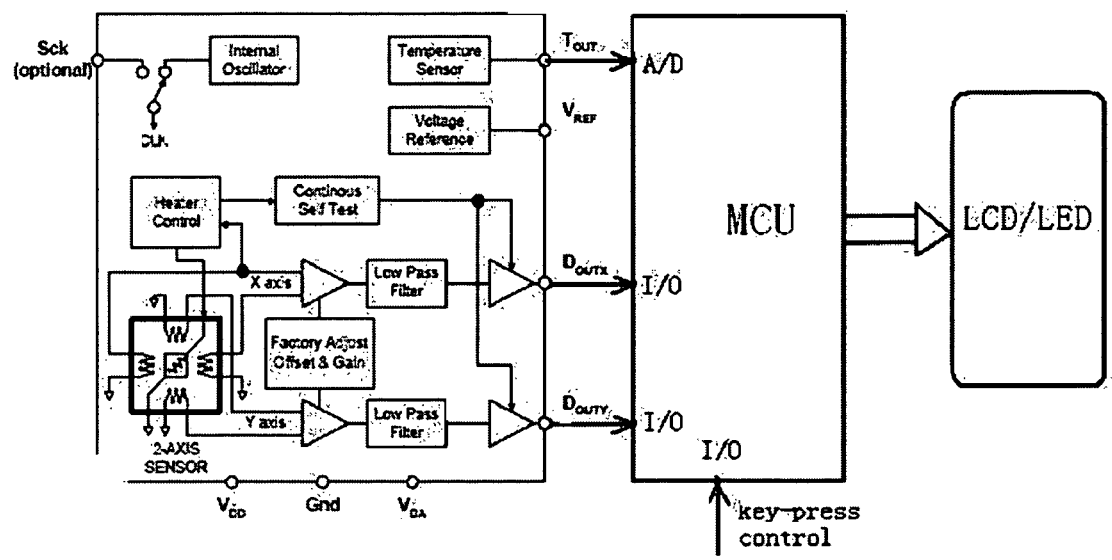
FIG. 9 is a circuit block diagram of the measuring device in accordance with the first embodiment of the invention.

With reference to FIGS. 7-9, the measuring device of the present invention comprises a silicon micro thermocouple type gravity acceleration sensor 1, a MCU data processing unit 2, a key-press control unit 3, a LCD/LED display unit 4, and a housing 5 comprised of a supporting and protecting member. The silicon micro thermocouple type gravity acceleration sensor 1 is an acceleration sensor designed based on MEMS (Micro Electro-Mechanical Systems) technology.

The function principle of the gravity acceleration sensor 1 is based on the conductance of free convection thermal field. The acceleration value is obtained by measuring the variation of internal temperature caused by the acceleration generator. The mass block of the sensor is gas, a heat source disposed at the central position of the silicon chip generates a suspending hot air masses in a cavity. Four thermal couple sets comprised of aluminum and polycrystalline silicon are disposed symmetrically and equidistantly in the four directions of the heat source.

When the silicon micro thermocouple type gravity acceleration sensor is free from acceleration or is disposed horizontally, the temperature decrease gradient is totally symmetric around the heat source. At this point, the voltages resulting from temperature inductance of the four thermocouple sets are identical. Owing to the conductance of the free convection thermal field, the acceleration at any direction can disturb the profile of the heat source, resulting in the asymmetry of the heat source, thus causing output voltage difference between the four thermocouple sets. The difference of the output voltage is proportional directly with the induced acceleration.

There are two totally identical acceleration signal transportation paths inside of the acceleration sensor; one path is used for measuring the induced acceleration on X axes, the other path is used for measuring the induced acceleration on Y axes. When the silicon micro thermocouple type gravity acceleration sensor is disposed vertically, within the rotation range of 360°, one of the gravity acceleration signals measured on X-axes and Y-axes changes from small to large, the other changes from large to small, and alternatively the cycle repeats indefinitely. The rotation angle position of the sensor then can be obtained by comparing and processing the signals output from the X-axes and Y-axes through the MCU data processing unit 2.

By detecting the cycle times of the signals on X-axes and Y-axes through the MCU unit, and in combination with the rotation angle position of the sensor, the actual rotation angle of the sensor can be calculated. The actual rotation angle of the sensor corresponds to the relative rotation angle variation of the rotational shaft of the screw mechanism. According to the screw driving equation characteristic to a screw mechanism, the linear displacement value L is equal to the lead S of the screw divided by a circular angle (360°) and multiplied by the relative rotation angle θ of the rotational shaft, namely, $$L=(S/360)*\theta.$$

The θ value can be calculated according to the signal output on X-axes and Y-axes of the silicon micro thermocouple type gravity acceleration sensor. The S value is input or selected through key-press control according to the actual value. After the linear displacement value L is calculated by the above formula, it can be transformed into metric or British system according to demand, and can be coded and digitally output and displayed on the LCD/LED display unit 4.

Specifically, if the lead of a lead screw is 10 mm, i.e., if a nut advances 10 mm with each revolution of a screw and if the relative rotation angle measured by the capacitive gravity acceleration sensor is 22°, then the linear distance L would be L=(10 mm/360°)×22°=0.61 mm. The linear distance can be displayed as 0.61 mm or in inches as 0.02406 inches. Similarly, if the lead of a lead screw is ½ inch, i.e., if a nut advances ½ inch with each revolution of a screw and if the relative rotation angle measured by the capacitive gravity acceleration sensor is 22°, then the linear distance L would be L=(½ inch/360°)×22°=0.0305 inches. The linear distance can be displayed as 0.0305 inches or in mm as 0.7761 mm.

Besides, owing to the existence of manufacturing errors and tolerances, lost motion due to, e.g., play may occur with the screw mechanism. Especially when the screw mechanism is moving back, such a situation could appear that the rotational shaft has started rotating, but the linear displacement does not start synchronously. Since the capacitive gravity acceleration sensor functions to detect and record the rotation angle variation of the rotational shaft, the obtained linear displacement value based on processing the rotation angle variation would be then inconsistent with the actual back movement linear displacement value. In view of this situation, a program is included in the program processing of the MCU unit to modify the back movement linear displacement value. The actual lost motion deviation value will be measured on site and then be input through key-press control to the program for modifying the displayed value (lost motion calibration), so that the measuring device of the invention is more accurate.

The housing 5 comprised of supporting and protecting member is designed with electric and magnetic shielding and dust/water protection, so that the capacitive gravity acceleration sensor and the MCU data processing unit are well protected; resistance to vibration, disturbance, and contamination are improved, and the operational stability and reliability of the measuring device are increased. The supporting and protecting member is designed with quick assembly and disassembly components, such as magnetic adhesion, quick assembly fitting members, according to demand, to facilitate the installation and maintenance of the measuring device.

In accordance with the second embodiment of the invention, the gravity acceleration sensor is a silicon micro thermocouple-type gravity acceleration sensor manufactured by applying MEMS technology. The manufacturing process is compatible with the conventional integrated circuit (IC), so that it is easy to be integrated with the signal processing circuit. This allows for convenient digitalization and mass production. It also provides the features of compact size, light weight, low cost, and high reliability. When measuring inclination angle with a low response speed, pulse power supplying can be applied, so that the influence of vibration to the measurement is reduced, and the energy consumption is decreased effectively, contributing to the practicality and versatility of the measuring device.

Example 3

Like in Example 2, the gravity acceleration sensor can be a constant acceleration sensor of a silicon micro capacitive-type, a silicon micro piezoelectric-type, a silicon micro resonant-type, or a silicon micro optical waveguide-type. A method for measuring the linear displacement of a screw mechanism comprises processing the sensor signal by the MCU data processing unit, controlling by the key-press control unit, displaying by the display unit, and supporting and protecting by the housing comprised of a supporting and protecting member. This realized the purpose of the devices of Examples 2 and 3.

This invention is not to be limited to the specific embodiments disclosed herein and modifications for various applications and other embodiments are intended to be included within the scope of the appended claims. While this invention has been described in connection with particular examples thereof, the true scope of the invention should not be so limited since other modifications will become apparent to the skilled practitioner upon a study of the drawings, specification, and following claims.

All publications and patent applications mentioned in this specification are indicative of the level of skill of those skilled in the art to which this invention pertains. All publications and patent applications mentioned in this specification are herein incorporated by reference to the same extent as if each individual publication or patent application mentioned in this specification was specifically and individually indicated to be incorporated by reference.

The invention claimed is:

1. An electronic measuring device for measuring and displaying a linear displacement of a horizontal screw mechanism, the device comprising:
   a gravity acceleration sensor, said gravity acceleration sensor measuring an angle of rotation value of a horizontal rotational shaft of a screw mechanism;
   a data processing unit, said data processing unit converting said angle of rotation value into a linear displacement value according to characteristics of the linear screw mechanism; and
   a digital display unit, said digital display unit displaying said linear displacement value;
   wherein
   said gravity acceleration sensor, said data processing unit, and said digital display unit are electronically or electrically connected, wherein said data processing unit converts said angle of rotation value into said linear displacement value according to the formula: $L=(S/360°)*\theta$, wherein L is the linear displacement value; S is the lead; and $\theta$ is the angle of rotation value.

2. The device of claim 1, wherein said horizontal screw mechanism is a leadscrew, a ball screw, a jackscrew, or a rack and pinion.

3. The device of claim 1, having a measuring range for measuring said angle of rotation value of between 0 and N*360° relative to vertical, wherein N is a number of rotation.

4. The device of claim 1, having a resolution for measuring said angle of rotation value of between 1.0° and 0.01° and an accuracy for measuring said angle of rotation value of between 1.0° and 0.01°.

5. The device of claim 1, wherein said gravity acceleration sensor is of a silicon micro capacitive-type, a silicon micro piezoelectric-type, a silicon micro thermocouple-type, a silicon micro resonant-type, a silicon micro optical waveguide-type; a membrane potential-type, or a disk capacitive gate-type.

6. The device of claim 1, further comprising a control unit for setting a reference point to zero.

7. The device of claim 1, wherein said data processing unit adjusts for lost motion.

8. The device of claim 1, wherein said digital display unit comprises a plurality of inclined reading windows displaying said linear displacement value.

9. A method of measuring and displaying a linear displacement of a horizontal screw mechanism using the device of claim 1, the method comprising:
   a) measuring an angle of rotation value of a horizontal rotational shaft of a screw mechanism;

b) converting said angle of rotation value into a linear displacement value according to characteristics of the linear screw mechanism; and c) displaying said linear displacement value.

10. The method of claim 9, wherein the horizontal screw mechanism is a leadscrew, a ball screw, a jackscrew, or a rack and pinion.

11. The method of claim 9, wherein said angle of rotation value is between 0 and N*360° relative to vertical, and N is a number of rotation.

12. The method of claim 9, wherein a resolution for measuring said angle of rotation value is between 1.0° and 0.01° and an accuracy for measuring said angle of rotation value is between 1.0° and 0.01°.

13. The method of claim 9, wherein said angle of rotation value is measured relative to the vertical using an inertial sensor sensitive to the Earth gravitational field.

14. The method of claim 13, wherein said sensor is of a silicon micro capacitive-type, a silicon micro piezoelectric-type, a silicon micro thermocouple-type, a silicon micro resonant-type, a silicon micro optical waveguide-type; a membrane potential-type; or a disk capacitive gate-type.

15. The method of claim 9, further comprising accounting for lost motion.

16. The method of claim 9, wherein said angle of rotation value is converted into said linear displacement value according to the formula: $L=(S/360°)*\theta$, wherein L is the linear displacement value; S is the lead; and $\theta$ is the angle of rotation value.

17. The method of claim 9, wherein said angle of rotation value is not measured at a location concentric with respect to said horizontal rotational shaft.

18. An electronic measuring device for measuring and displaying a linear displacement of a horizontal screw mechanism, the device comprising:

a gravity acceleration sensor, said gravity acceleration sensor measuring an angle of rotation value of a horizontal rotational shaft of a screw mechanism;

a data processing unit, said data processing unit converting said angle of rotation value into a linear displacement value according to characteristics of the linear screw mechanism; and a digital display unit, said digital display unit displaying said linear displacement value;

wherein said gravity acceleration sensor, said data processing unit, and said digital display unit are electronically or electrically connected; and said data processing unit converts said angle of rotation value into said linear displacement value according to the formula: $L=(S/360°)*\theta$, wherein L is the linear displacement value; S is the lead; and $\theta$ is the angle of rotation value.

19. A method of measuring and displaying a linear displacement of a horizontal screw mechanism using the device of claim 18, the method comprising:

a) measuring an angle of rotation value of a horizontal rotational shaft of a screw mechanism;

b) converting said angle of rotation value into said linear displacement value according to the formula: $L=(S/360°)*\theta$, wherein L is the linear displacement value; S is the lead; and $\theta$ is the angle of rotation value; and c) displaying said linear displacement value.

20. The device of claim 18, wherein the device is attached to the horizontal screw mechanism in an off-center position.

* * * * *